March 20, 1956
C. EAMES
2,738,835
UPHOLSTERY PAD
Filed Dec. 8, 1952
5 Sheets-Sheet 1
FIG. 1.
FIG. 2.
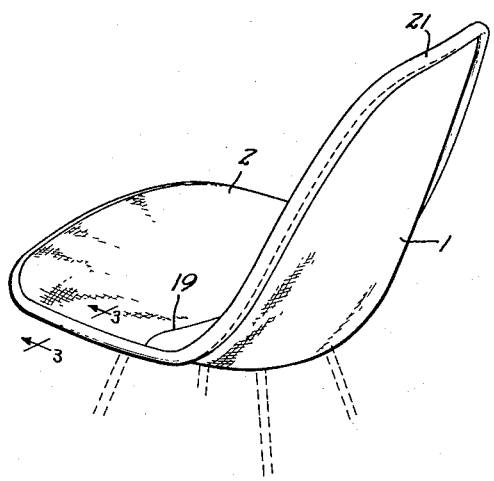
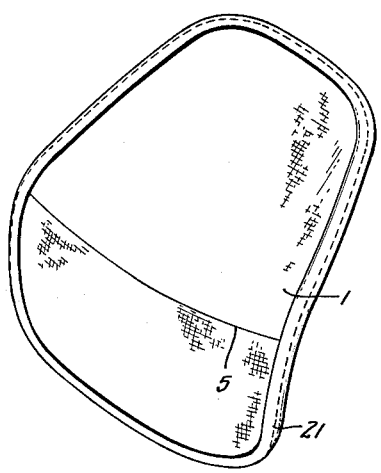
FIG. 3.
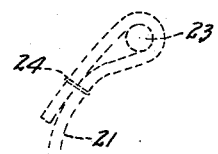
INVENTOR
CHARLES EAMES
BY
Curtis, Morris & Safford.
ATTORNEYS March 20, 1956  C. EAMES  2,738,835
UPHOLSTERY PAD Filed Dec. 8, 1952  5 Sheets-Sheet 2

INVENTOR
CHARLES EAMES
BY
Curtis, Morris & Safford
ATTORNEYS

March 20, 1956

C. EAMES 2,738,835

UPHOLSTERY PAD

Filed Dec. 8, 1952

5 Sheets-Sheet 3

INVENTOR
CHARLES EAMES
BY
Curtis Morris & Safford
ATTORNEYS

March 20, 1956 C. EAMES 2,738,835
UPHOLSTERY PAD

Filed Dec. 8, 1952 5 Sheets-Sheet 4

INVENTOR
*CHARLES EAMES*
BY
*Curtis, Morris & Safford*
ATTORNEYS

March 20, 1956 C. EAMES 2,738,835
UPHOLSTERY PAD
Filed Dec. 8, 1952 5 Sheets-Sheet 5

INVENTOR
CHARLES EAMES
BY
Curtis Morris & Safford.
ATTORNEYS

United States Patent Office 2,738,835
Patented Mar. 20, 1956

2,738,835
UPHOLSTERY PAD

Charles Eames, Santa Monica, Calif., assignor to Herman Miller Furniture Company, Zeeland, Mich., a corporation of Michigan Application December 8, 1952, Serial No. 324,670

4 Claims. (Cl. 155—184)

Figure 4:
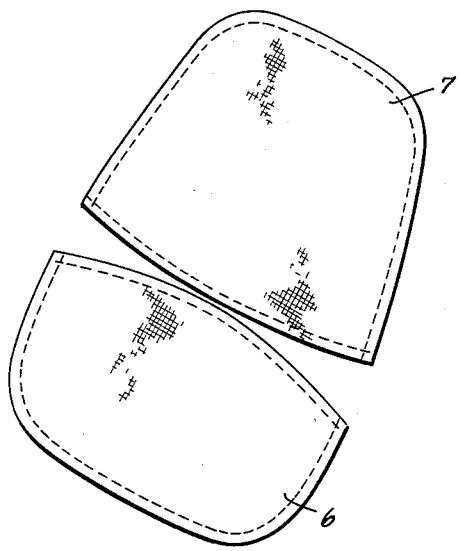
Figure 5:
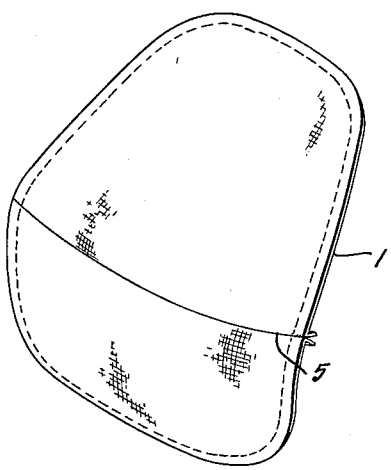
Figure 6:
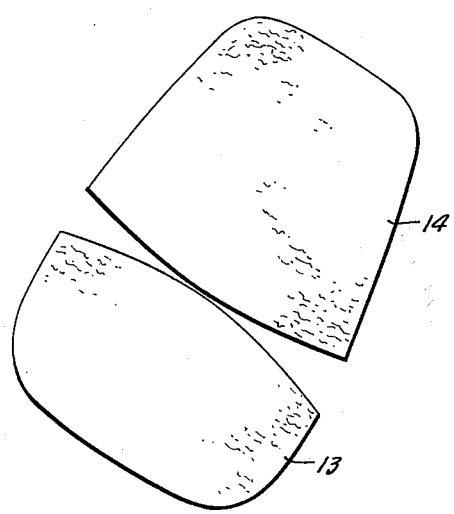
Figure 7:
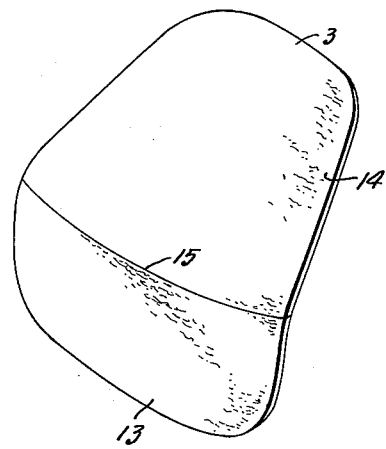
Figure 8:
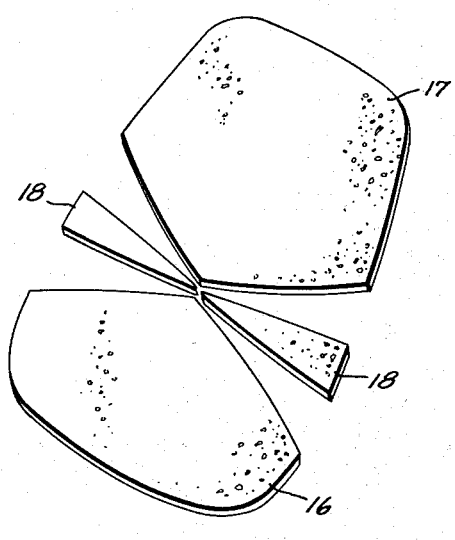
Figure 9:
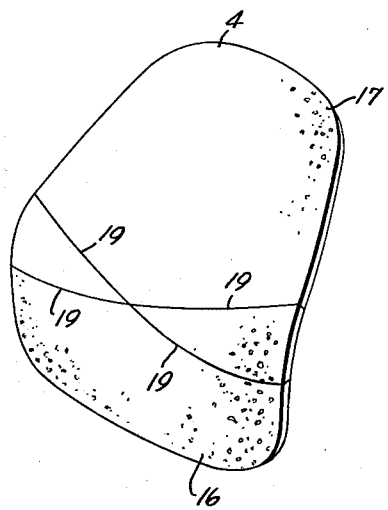
Figure 10:
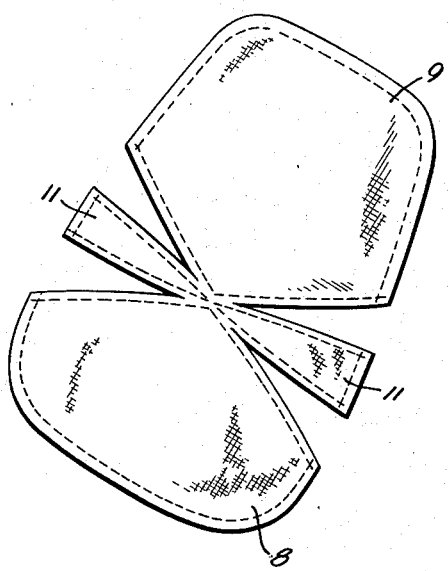
Figure 11:
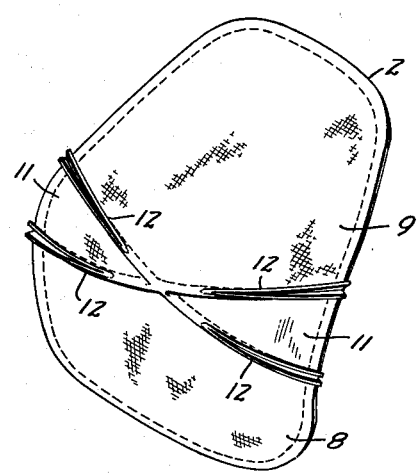
Figure 12:
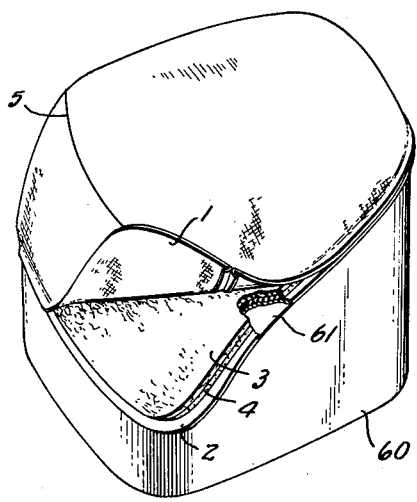
Figure 13:
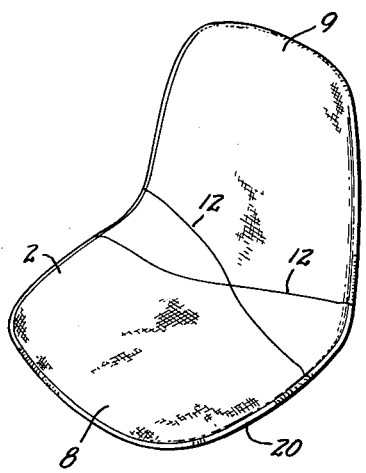
Figure 14:
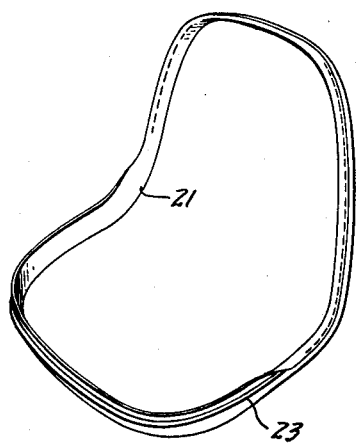
Figure 15:
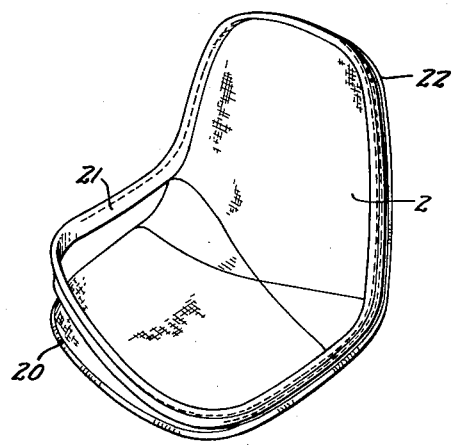
Figure 16:
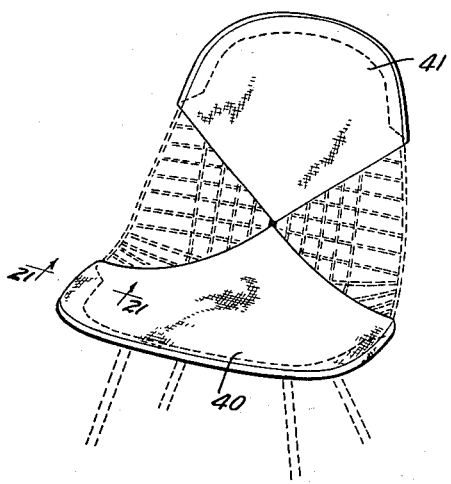
Figure 17:
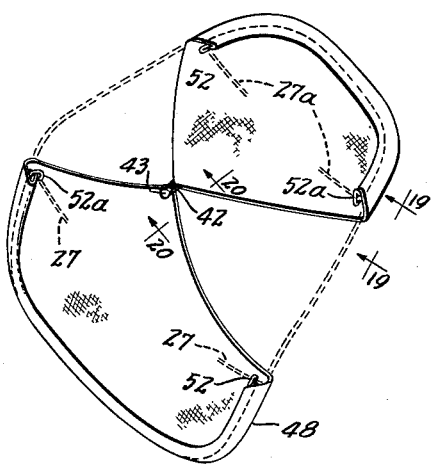
Figure 18:
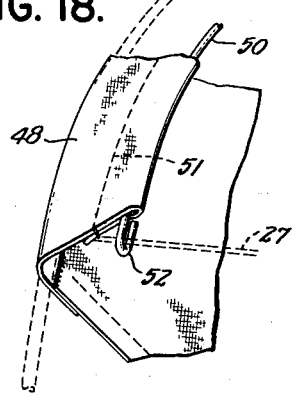
Figure 19:
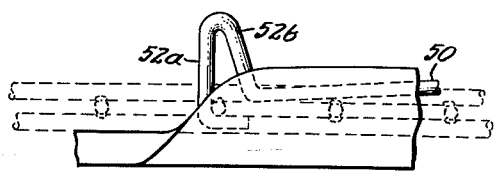
Figure 20:
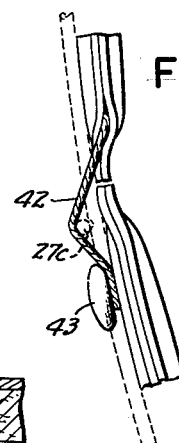
Figure 21:
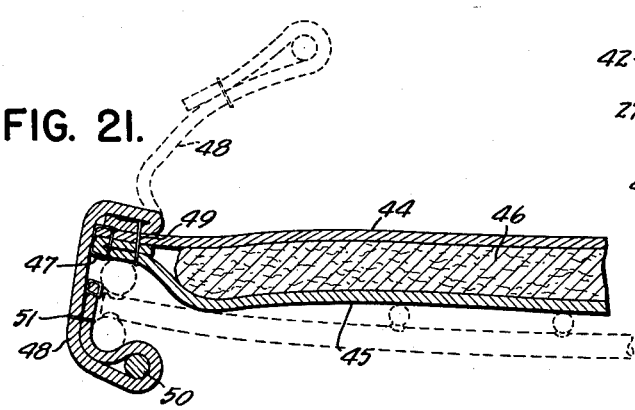

The present invention relates to upholstery pads and method of making the same. An object thereof has been to provide upholstery for chairs, or the like, in the form of a readily attachable and removable pad of inherent curved contour conforming closely to that of the chair surface, for example, to which the pad is to be applied. A further object has been to provide upholstery including a preformed pad having a predetermined "built-in" contour which, in part by reason of conforming to the contour of its supporting surface when in use, retains its initial pleasing shape and is not subject to injury or impairment due to strains or stresses on the constituent parts such as occur in the normal use of conventional upholstery. A further object has been to provide durable and sightly upholstery units or pads which can be produced effectively and economically in various colors and fabrics by mass methods; which can be used interchangeably on various types of chairs; which can be packed and shipped in nested relation separately from the chair, or other frames; and which can easily be applied to such frames at the store or in the home without the aid of tools. Other objects and advantages of the invention in production and use will appear in part from the following specification and the appended drawings wherein:

Figure 1 is a view in perspective of a unitary chair seat and back pad as applied to a dining-type chair;

Figure 2, a view in perspective showing more clearly the rear back and under seat portions of the pad illustrated in Figure 1;

Figure 3, a fragmentary sectional view on the line 3—3 of Figure 1;

Figure 4, a plan view showing pieces of fabric, as burlap, cut to form a bottom cover layer for the pad;

Figure 5, a perspective view showing a bottom cover made by sewing together the pieces shown in Figure 4 to form a fabric layer having a contour approximating that of the chair or other surface which the pad is intended to cover;

Figure 6, a plan view showing pieces of resilient sheet material, as hair felt, cut to form an under layer of the pad core;

Figure 7, a view in perspective showing the resilient hair felt under layer having a sectional contour conforming approximately to that of said bottom fabric cover;

Figure 8, a plan view showing pieces of a resilient rubber-like material, as shredded latex in sheet form, cut to provide, when assembled with said felt layer, the upper layer of the pad core;

Figure 9, a view in perspective of said pad core upper layer of rubber shaped to conform in contour and outline to said lower layer of felt;

Figure 10, a plan view of a piece of upholstery fabric cut and shaped to form a blank for the upper or outer cover of the pad;

Figure 11, a rear view in perspective of the top or outer pad cover formed from the piece shown in Figure 10 and having approximately the same contours as those of the previously described pad layers;

Figure 12, a view in perspective of a mold block having a top mold or shaping surface of compound curved contour corresponding in general to that of the previously described pad layers and to that of the chair frame, or the like, on which the pad is to be mounted and used, said pad layers being shown thereon in assembled relation, one cover layer thereof being bent back to reveal the core and the other cover layer, and parts of said other layers being broken away to expose a portion of the top or shaping surface of the mold block;

Figure 13, a front view in perspective showing the pad body after removal from the mold and with overlapping edge portions of the cover layers stitched together to enclose and conceal the core;

Figure 14, a view in perspective of a fastening band of fabric with a portion of its peripheral pocket laid open to show the wire fastening ring enclosed therein;

Figure 15, a view in perspective of the pad body shown in Figure 13 with the band and ring of Figure 14 in process of being secured to edge portions thereof;

Figure 16, a front view in perspective of a two-part upholstery pad as applied to a wire mesh shell type of chair frame;

Figure 17, a rear view in perspective of the pads of said two-part pad in applied relation to each other;

Figure 18, an enlarged fragmentary view showing in detail the fastening wire mounted in the marginal band of said pads;

Figure 19, an enlarged fragmentary view taken from the line 19—19 of Figure 17 showing in detail a modified form of end hook for one end of the fastening wires;

Figure 20, an enlarged fragmentary view from the line 20—20 of Figure 17 showing details of devices for attaching adjoining end portions of the two pads when applied or mounted as shown in Figure 16; and Figure 21, an enlarged sectional view on the line 21—21 of Figure 16 showing details of construction of the two pads and the relative positions of portions thereof when applied to the seat or back of a wire mesh shell type of chair frame.

The invention, as incorporated in an upholstery pad for furniture, resides in a pad structure wherein a composite core of layers of resilient materials having different characteristics is enclosed between fabric covers which are secured together along their peripheral edges; and said core layers and said covers are adhesively joined to form in effect a unitary pad body; and each of said layers and said unitary pad body inherently has and retains sectional contours corresponding approximately to those of the body-supporting surfaces of the chair frame, or other article of furniture to which the pad is to be applied; and the pad is provided with a flexible marginal fastening band by which it is readily attached to and detached from a chair frame or the like.

The invention, as exemplified in the method of making said pads, includes the steps of cutting suitable fabrics to shape blanks for the front cover and the back cover of the pad, respectively, said back cover blanks being cut to produce a single transverse curved seam and said front cover blank being cut to have converging transverse seams; cutting suitable resilient sheet materials to the desired shapes and forming core layers therefrom, one of which layers has a transverse curved seam or joint and the other of which has converging transverse seams or joints; applying a rubber cement coating to inside surfaces of said covers and to the surfaces of said core layers; assembling said covers and said core layers on a core block with their opposed coated surfaces in contact and with edge portions of the covers extending beyond edge portions of the core layers; and applying pressure to said covers and said core layers so assembled to compress them into a unitary pad body with a sectional contour corresponding to that of the forming or shaping surface of the mold block. Thereafter, the pad body so formed is trimmed, if needed, and the retaining band and ring are stitched to the outer edge of the cover.

As shown more clearly in Figures 1–3, inclusive, of the drawings, one form of upholstery pad embodying the invention includes in effect an envelope comprising a back or bottom cover 1 of fabric, as burlap, and a top or outer cover 2 preferably of a suitable upholstery fabric. Enclosed within the covers is a flexible and resilient composite core consisting of a layer 3 of tough fibrous felt, or the like, and a layer 4 of rubber-like material, such as a shredded latex in sheet form. The contiguous surfaces of the core layers 3 and 4 are held together by an adhesive coating, as rubber cement. The top cover 2 is similarly secured to the outer or upper surface of the rubber-like layer 4; and the bottom cover 1 is similarly secured to the lower or bottom surface of the felt layer 3. The pad body made up of the elements above described is of curved cross and longitudinal sectional contour which is inherent in or remains a substantially permanent characteristic of the structure.

The back cover 1 is a sheet or layer of suitable fabric, as heavy burlap, having a curved seam 5, Figures 2 and 5, conveniently formed by sewing together the transverse edge portions of a seat portion 6 and a back portion 7, Figure 4. This gives to said cover 1 an initial curved or dished contour.

The front cover 2, Figure 11, is a sheet or layer of suitable upholstery fabric, preferably of a sturdy and durable type, made from a blank including a seat 8, a back 9 and gores or gussets 11, Figures 10 and 11. Said parts are stitched along the transverse seams 12 to form a top cover having an initial curved or dished contour corresponding to that of the bottom cover.

The seat portion 13 and the back portion 14, Figure 6, of the felt layer 3 have transversely curved edge portions rubber-cemented together on the curved transverse seam or joint 15, Figure 7, thus producing a layer of dished or curved contour. The seat portion 16, Figure 8, the back portion 17, and the gores or gussets 18 of the rubber-like layer 4 are rubber-cemented along the transverse curved joints or seams 19 to produce the rubber-like layer 4 of curved contour. Thus, the contours of said layers 3 and 4 correspond to those of said covers 1 and 2 respectively.

The cover and core members above described are of substantially the same outer shape and similarly dished or contoured so that, when assembled, the complete pad body will inherently have and retain approximately the shape and contour characteristics of said parts. A method of assembling the core and cover to produce the pad body is to be described hereinafter.

As seen more clearly in Figure 3, outer edge portions of the front and back fabric covers 1 and 2 extend beyond the periphery of the composite core; and overlapping portions thereof are joined, as by stitching at 20. A pad retaining band 21, Figures 3, 14, and 15, is secured to peripheral edge portions of the pad cover, as by stitching at 22. Said band 21 carries a wire ring 23 secured in a fold or pocket at its outer edge formed by stitching, as at 24. The unfinished outer edge of the band strip may be protected against ravelling by edge stitching 25.

Upholstery pad embodying the above-described features are more particularly adapted for use with furniture, such as chairs, wherein the seat and back are of substantially the same contour as that of said pads. Thus, when such a pad is placed over the seat and back of such a chair, the pad fits snugly thereon. A portion of a pad having the described characteristics is shown in Figure 3 as applied to a chair frame or shell (shown in dotted lines) wherein a body supporting mesh is provided by longitudinal wires 26 and transverse wires 27 welded together at 28. Rim wires 29 and 30 are welded to end portions of the mesh wires, as at 31. To retain the pad in place on such a chair, the band 21 is swung from dotted line position, i. e. generally at the front or upper side of the pad and of the chair seat and back, to its operative retaining position wherein it embraces and conceals the edge of the chair seat and back continuously around its perimeter. This also brings the wire ring 23 into locking or pad securing position at the rear side of the chair seat and back. Accordingly, where the ring 23 is of the proper peripheral extent, i. e. slightly smaller, in relation to the outside peripheral extent of the chair and seat edge, said ring 23 will clip securely and snugly behind the peripheral wire 29 to retain the pad in its proper place on the chair. Thus, the band 21 and ring 23, in use not only retain the pad in place but also impart a compact and smart appearance to the piece so upholstered. It will be apparent that material economies are effected by producing the upholstery as a separate unit and applying the same to the chair frame in a simple snap-on or clip-on operation involving no need for highly skilled operatives at this stage of production.

In a modification, shown as a two-piece pad in Figures 16–21, as distinguished from the single unit pad above described, the seat portion 40 is separate from the back portion 41 but is connected thereto in use by suitable means, such as a cord loop 42 on one pad and a button 43 on the other, Figure 20. As shown in Figure 21, pads 40 and 41 include front and back fabric covers 44 and 45, respectively, enclosing a core 46 of suitable resilient flexible material which may be that previously described in connection with the single pad. The peripheral overlapping edges of said covers are secured together by stitching 47; and the inner edge of a fastening band 48 is secured to a portion of said overlapping edge of the cover by stitching 49. In general, said band 48 is attached to that portion of the pad edge which, when in position on a chair, for example as indicated in Figures 16 and 17, conforms or corresponds in peripheral contour to the outer edge of the chair seat or back, as the case may be. A fastening wire 50 extends through an open ended pocket on said band formed by folding back the outer edge thereof and stitching it down, as at 51, Figure 21. The outer ends of said wires 50 are bent to form hooks 52 and 52a, the latter being provided with a hump portion 52b to facilitate attaching and removal operations.

The back pad 41 is made in the same manner and embodies essentially the same structure as seat pad 40 but varies in shape and size therefrom depending on the peripheral edge contours and dimensions of the back and seat portions respectively of the chair frames to which said pads are intended to be attached for use.

In attaching pads 40 and 41 to a mesh-type chair frame or shell of the general type indicated in dotted lines, Figures 3, 16, 19, 20 and 21, the band 48 is folded back from the dotted line position to the full line position, Figure 21, i. e. so that band 48 overlaps and covers the chair seat front edge, or the chair back top edge. Hook 52 is engaged with a cross wire, as 27, for seat pad 40 or with a different cross wire 27a, Figure 17, for back pad 41. The hooks 52a on pads 40 and 41 are also engaged with cross wires 27 and 27a, respectively, when the tips of the angle shaped edges of pads 40 and 41 are drawn to approximately the relative position shown in Figures 16, 17 and 20. The cord loop 42 is drawn to the rear and over another transverse wire 27c and the loop end is engaged with button 43.

With the above-described construction, hooks 52 and 52a on both pads are concealed when said pads are attached to a chair and the latter is viewed from in front. Furthermore, said hooks are so located that the pad core 46 when in position comes effectively between their inner ends and the person of a sitter. Thus, the above-described "two piece" pad provides a comfortable and attractive looking chair covering which is light in weight and capable of being manufactured and applied to furniture with material economy as compared to "built-on" upholstery.

A practical method of making the body portion of the type of pad illustrated in Figures 1 and 2, for example, includes the steps of forming, as by cutting, the several pieces of fabric and core material illustrated in Figures 4 to 11 inclusive and hereinabove more particularly described. The burlap fabric pieces 6 and 7 are joined by stitching along seam 5 to form the pad back cover 1; and the several parts of fabric shown in Figure 10 are joined by stitching to form the pad top cover 2.

To assemble the covers 1 and 2 and the core pieces 3 and 4 in forming the pad body, the pad top cover 2 is placed on a mold form 60, Figure 12, having a generally convexly contoured top mold or shaping surface 61 closely approximately the shape and size to be imparted to said pad body. The outer surface of the cover 2 lies against said surface 61 and the inner surface thereof is exposed. A coating of rubber cement is applied, as by spraying on said inside surface of cover 2. Rubber cement is also applied, as by spraying on the top and bottom and the cooperating adjoining edge surfaces of the several pieces of rubber-like sheet material shown in Figure 8 which are then placed, in the arrangement shown in Figure 9, on top of said rubber cement-coated exposed inner surface of cover piece 2, as it lies on said mold surface 61, to form layer 4. Rubber cement is applied or sprayed on the top and bottom and the adjoining edge surfaces of the pieces of sheet felt, Figure 6, which are then placed, in the arrangement shown in Figure 7, as core layer 3 on top of the rubber cement-coated pieces forming core layer 4. The inner surface of the bottom fabric cover 1 is also coated with rubber cement; and said cover 1 is placed with its rubber-coated surface down on top of the core layer 3. In effect, each succeeding layer added to the assembly laid up on mold surface 61 is snugly nested and in adhering contact with the next preceding layer. Pressure is applied to the assembled layers sufficiently to mold or compress them into a unitary mass or pad body which, when removed from mold 60, will inherently have and retain its intended mold contour.

After removal from the mold, the pad body is trimmed at the edges where needed; and those peripheral portions of the covers 1 and 2 which extend beyond the peripheral edge of the core are overlapped and secured together by stitching 20. The pad is completed for use by adding suitable fastening devices, such as the peripheral retaining ring and band previously described, by which said pad may be releasably attached to a chair or the like. Similar procedures may be employed to produce the body portions of the "two piece" pads, Figures 16–21.

I claim:
1. An upholstery pad readily attachable to and detachable from a chair, or the like, having a body conforming and supporting seat and back, said pad comprising a core of resilient material inherently contoured to conform thereto, an upper fabric cover and an under fabric cover adhesively joined to the upper and under surfaces, respectively, of said core, edge portions of said covers being joined to provide an outwardly extending peripheral fabric flange, a fabric band encircling said core and having its inner edge secured to said flange and its outer edge overlying and secured to a longitudinally extending midportion of said band to form a hem, and an endless substantially non-extensible wire co-extensive with and enclosed within said hem.

2. Upholstery pad according to claim 1 and wherein the fabric cover includes a back section in two parts stitched together along a single curved seam and a front section having parts stitched together along convergent seams.

3. Upholstery pad according to claim 1 and wherein the core includes a felt layer in two sections joined along inner curved edge portions to form a single curved joint and a rubber-like layer in four sections, including a pair of V-shaped sections arranged with their convergent edges joined to convergent edges of the remaining two sections, said felt and rubber-like layers being adhesively joined to form a composite core and said fabric cover being adhesively joined to said composite core.

4. Upholstery pad which is attachable to and detachable from a chair, or the like, compriisng a resilient core, a fabric cover enclosing said core, a flexible band including a hem attached to outer edge portions of said cover, a wire frame secured in said hem and having its ends extending beyond the ends of said band, said wire frame ends being bent to form attaching means arranged and adapted to be engaged with and disengaged from said chair, and pad connecting means on said cover effectively positioned between the ends of said bands adjacent to an inner end portion of the pad and arranged and adapted to cooperate with connecting means on another pad when said pads are attached to the seat and back portions, respectively, of a chair.

References Cited in the file of this patent
UNITED STATES PATENTS

| | | |
|---|---|---|
| 1,499,166 | Frazier | June 24, 1924 |
| 1,610,286 | Hood et al. | Dec. 14, 1926 |
| 1,645,248 | Lower | Oct. 11, 1927 |
| 2,192,070 | Cramer et al. | Feb. 27, 1940 |
| 2,198,724 | Schreiner | Apr. 30, 1940 |
| 2,241,473 | Nordmark | May 13, 1941 |
| 2,246,662 | Bloomberg | June 24, 1941 |
| 2,277,951 | Bloomberg | Mar. 31, 1942 |
| 2,314,046 | Kalter | Mar. 16, 1943 |
| 2,483,223 | Moss | Sept. 27, 1949 |
| 2,525,670 | Hamilton | Oct. 10, 1950 |
| 2,567,550 | Clark | Sept. 11, 1951 |

FOREIGN PATENTS

| | | |
|---|---|---|
| 691,998 | Germany | June 10, 1940 |